US008432323B2

(12) United States Patent
Bit-Babik et al.

(10) Patent No.: US 8,432,323 B2
(45) Date of Patent: Apr. 30, 2013

(54) ANTENNA INTEGRATED WITH A PORTABLE COMMUNICATION DEVICE

(75) Inventors: Giorgi Bit-Babik, Sunrise, FL (US); Jody H. Akens, Weston, FL (US); Thomas J. Chappell, Coconut Creek, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 327 days.

(21) Appl. No.: 12/846,898

(22) Filed: Jul. 30, 2010

(65) Prior Publication Data

US 2012/0026046 A1 Feb. 2, 2012

(51) Int. Cl.
*H01Q 1/24* (2006.01)
*H04B 1/38* (2006.01)

(52) U.S. Cl.
USPC .......................................... 343/702; 455/575.7

(58) Field of Classification Search .................. 343/702, 343/700 MS, 846–849; 455/575.1–575.9, 455/90.1–90.3
See application file for complete search history.

(56) References Cited

U.S. PATENT DOCUMENTS 7,068,227 B2 6/2006 Ying
7,750,854 B2 * 7/2010 Wedel et al. .................. 343/702
2003/0164798 A1 9/2003 Nevermann
2004/0171404 A1 9/2004 Annamaa et al.
2006/0038733 A1 * 2/2006 Wedel et al. .................. 343/795
2007/0035454 A1 2/2007 Zarnowitz et al.
2011/0037664 A1 * 2/2011 Cho et al. ...................... 343/702
2012/0026046 A1 * 2/2012 Bit-Babik et al. ............ 343/702

FOREIGN PATENT DOCUMENTS

WO 2007077461 A1 7/2007

OTHER PUBLICATIONS

PCT International Search Report Dated Jan. 2, 2012 for Counterpart Applicatiion PCT/US2011/042500.

* cited by examiner

*Primary Examiner* — Daniel D Chang
(74) *Attorney, Agent, or Firm* — Anthony P. Curtis; Daniel R. Bestor

(57) ABSTRACT

A radio is presented in which a short-range antenna, along with a speaker, is contained within a non-conductive speaker bracket. The antenna is a PIFA that is bent and extends through the speaker bracket so that the distance between the free end of the PIFA and various metallic components of the radio including the chassis and speaker is maximized. The structure containing the PIFA is flexible and also contains a contact area where feed/ground contact for the PIFA is made as well as contact for audio components including a speaker and microphone. A flexible cable and extension portion of the flexible structure routes the signals to the audio components far enough away from the PIFA so that the amount of crosstalk is insignificant. The free end of the PIFA and launch pad where feed/ground contact for the PIFA is made are non-planar.

19 Claims, 10 Drawing Sheets

ANTENNA INTEGRATED WITH A PORTABLE COMMUNICATION DEVICE

TECHNICAL FIELD

The present application relates generally to a communication device and in particular to a communication device containing a multi/broadband antenna of reduced size.

BACKGROUND

With the ever-increasing demand for portable communication devices, coupled with the advent of disparate technologies, it has been desirable to provide communication devices that operate in different frequency bands. The ability to use multiple frequency bands has many advantages, for example, permitting communications in different locations around the world in which one or more of the different bands are used, providing a backup so that the same information can be provided through the different bands, or permitting different information to be provided to the device using the different frequencies and permitting the device to determine the manner in which to respond to the different information.

While the introduction of an additional frequency band provides additional functionality, the design and incorporation of a single antenna that operates satisfactorily in all of these bands may not be feasible for certain structures from a cost or efficiency standpoint or may be unwieldy from the standpoint of user. In many instances it is more desirable to provide a separate antenna for the new frequency band. However, the use of two or more external antennas may not be desirable, both for reasons above as well as problems such as cost and manufacturing inherent in altering the external structure of an already-existing communication device (e.g., there may be a lack of dedicated volume/space for the additional antenna element).

Accordingly, it would be desirable to provide a separate antenna that can be readily integrated into an existing communication device without necessitating excessive external changes to the communication device.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
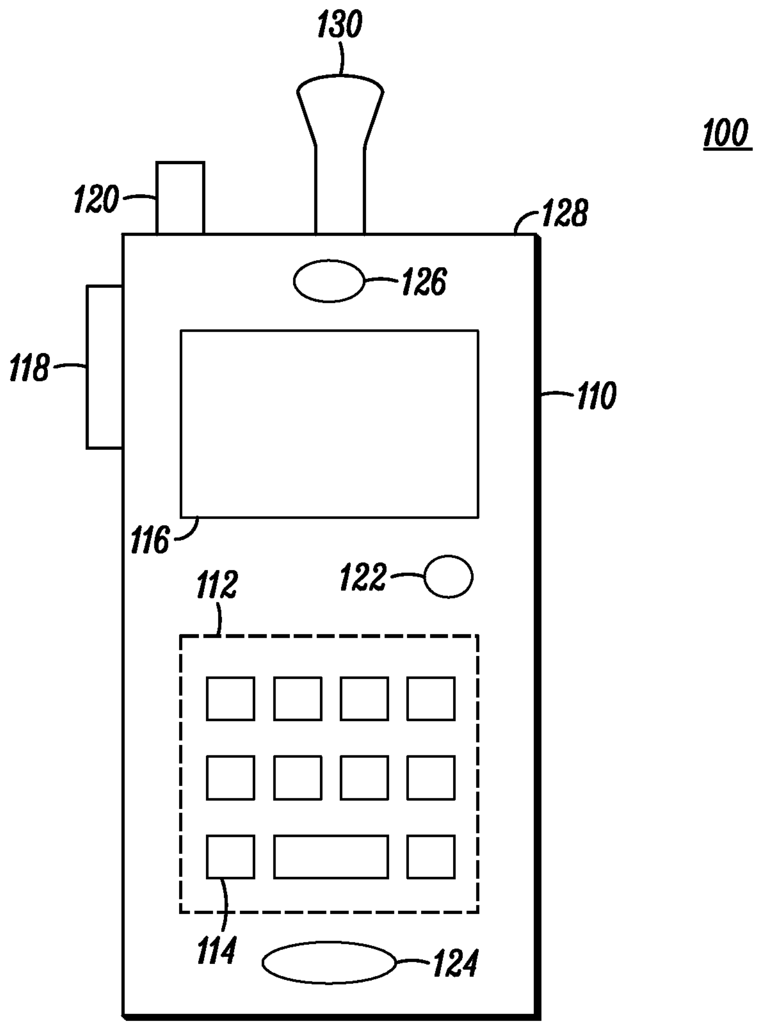
FIG. 1 illustrates one embodiment of a communication device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the embodiments of shown.

The apparatus and method components have been represented where appropriate by conventional symbols in the drawings, showing only those specific details that are pertinent to understanding the embodiments shown so as not to obscure the disclosure with details that will be readily apparent to those of ordinary skill in the art having the benefit of the description herein. Other elements, such as those known to one of skill in the art, may thus be present.

DETAILED DESCRIPTION

Before describing in detail the various embodiments, it should be observed that such embodiments reside primarily in combinations of apparatus components related to a radio having antennas designed for short and long range communications. The short-range antenna is a PIFA and is contained internally in the radio chassis in a non-conductive speaker bracket. The speaker bracket also contains a speaker. The PIFA is part of a flexible structure that also contains a contact area, a flexible cable and an extension portion. Feed/ground contact for the PIFA is made in the contact area, as is contact for audio components including a speaker and microphone of the radio. The flexible cable and extension portion of the flexible structure route the audio signals to the audio components. The flexible cable and extension portion are far enough away from the PIFA so that the amount of crosstalk is insignificant. The launch pad where feed/ground contact for the PIFA is made is disposed at a surface of the speaker bracket, while the PIFA is bent such that the PIFA extends into the speaker bracket, with the free end of the PIFA leveling out and being disposed in a corner of the speaker bracket. The free end and launch pad are thus non-planar. The free end of the PIFA is disposed such that the distance between the free end of the PIFA and various metallic components of the radio including the chassis and speaker is maximized.

One embodiment of a portable communication device is shown in FIG. 1. The communication device 100 has a body 110 to which an external antenna 130 is connected via known means such as screwing in the antenna 130 to a tapped receiving structure (not shown) in the body 110. The tapped receiving structure typically resides in the top face 128 of the radio. The antenna 130 provides multiband transmission and reception. The body 110 contains internal communication components and circuitry as further described with relation to FIG. 2 to enable the device 100 to communicate wirelessly with other devices using the antenna 130. The body 110 may also contain I/O devices such as a keyboard 112 with alpha-numeric keys 114, a display 116 (e.g., LED, OELD) that displays information about the device 100, a PTT button to transmit 118, a channel selector knob 122 to select a particular frequency for transmission/reception, soft and/or hard keys, touch screen, jog wheel, a volume control 120, a microphone 124, and a speaker 126. The channel selector knob 122 and/or keyboard 112, for example, may be used to select the operating band/channel. In other embodiments, rather than manually switching the antenna operating band, the selector operates the radio itself and the antenna responds automatically to the required channel. Not all of the I/O devices shown in FIG. 1 may, of course, be present depending on the particular communication device 100 in which the antenna 130 is being employed.

Figure 2:
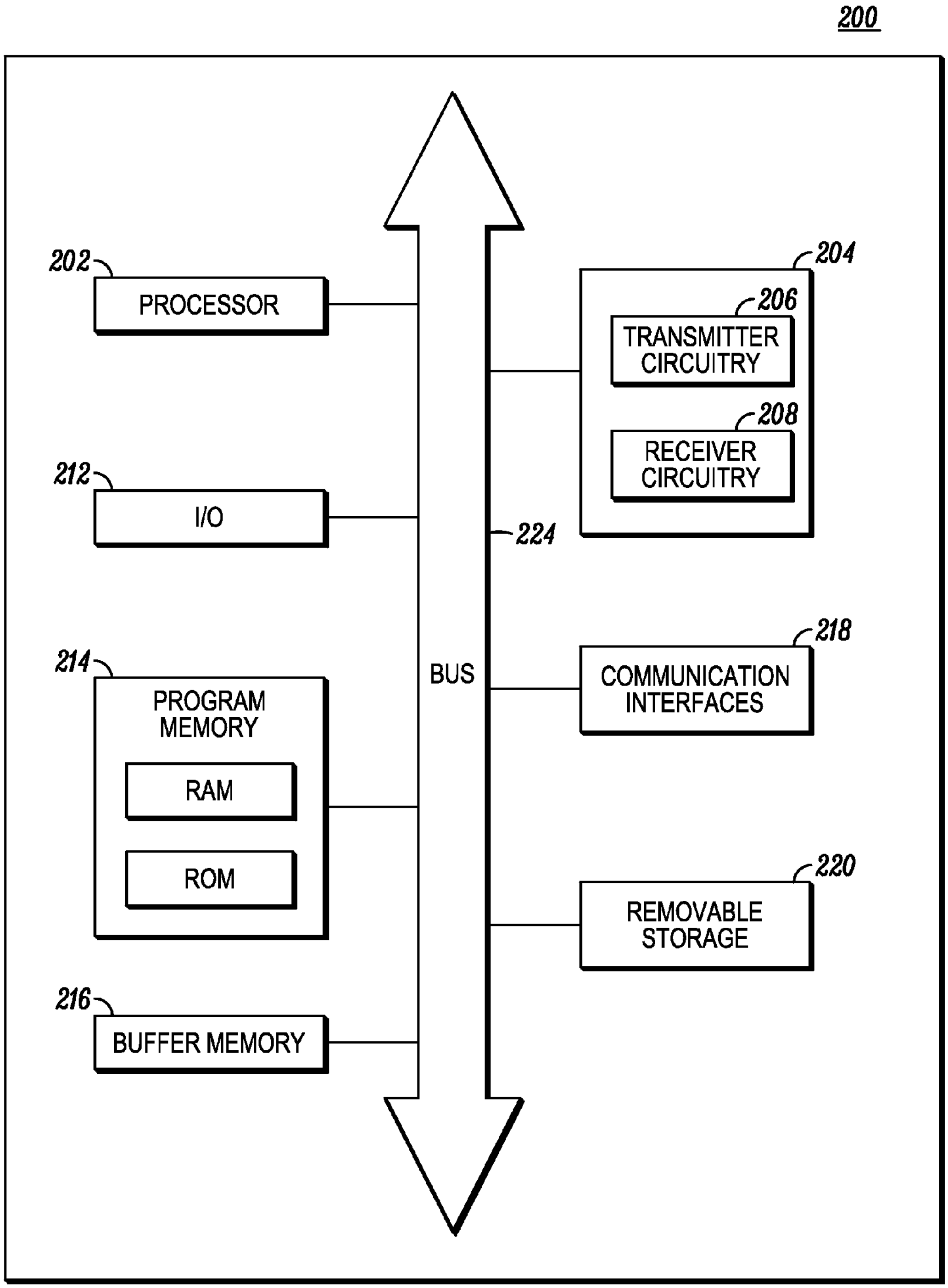
FIG. 2 illustrates an internal block diagram of an embodiment of a communication device.

Turning to the electronics within the portable communication device, one embodiment is shown in the block diagram of FIG. 2. The communication device 200 contains, among other components, a processor 202, a transceiver 204 including transmitter circuitry 206 and receiver circuitry 208, the I/O devices 212 described in relation to FIG. 1, a program memory 214 for storing operating instructions (such as estimation and correction of a received signal and encryption/decryption) that are executed by the processor 202, a buffer memory 216, one or more communication interfaces 218, and a removable storage 220. The communication device 200 is preferably an integrated unit containing at least all the elements depicted in FIG. 2, as well as any other element necessary for the communication device 200 to perform its electronic functions. The electronic elements are connected by a bus 224.

The processor 202 includes one or more microprocessors, microcontrollers, DSPs, state machines, logic circuitry, or any other device or devices that process information based on operational or programming instructions. Such operational or programming instructions are preferably stored in the program memory 214. The program memory 214 may be an IC memory chip containing any form of random access memory (RAM) or read only memory (ROM), a floppy disk, a compact disk (CD) ROM, a hard disk drive, a digital video disk (DVD), a flash memory card or any other medium for storing digital information. One of ordinary skill in the art will recognize that when the processor 202 has one or more of its functions performed by a state machine or logic circuitry, the program memory 214 containing the corresponding operational instructions may be embedded within the state machine or logic circuitry. The operations performed by the processor 202 and the rest of the communication device 200 are described in detail below.

The transmitter circuitry 206 and the receiver circuitry 208 enable the communication device 200 to respectively transmit and receive communication signals. In this regard, the transmitter circuitry 206 and the receiver circuitry 208 include appropriate circuitry to enable wireless transmissions. The implementations of the transmitter circuitry 206 and the receiver circuitry 208 depend on the implementation of the communication device 200 and the devices with which it is to communicate. For example, the transmitter and receiver circuitry 206, 208 may be implemented as part of the communication device hardware and software architecture in accordance with known techniques. One of ordinary skill in the art will recognize that most, if not all, of the functions of the transmitter or receiver circuitry 206, 208 may be implemented in a processor, such as the processor 202. However, the processor 202, the transmitter circuitry 206, and the receiver circuitry 208 have been artificially partitioned herein to facilitate a better understanding. The buffer memory 216 may be any form of volatile memory, such as RAM, and is used for temporarily storing received information.

In many instances, portable communication devices such as the radios shown in FIGS. 1 and 2 were initially designed for long range communications. Examples of these portable communication devices include public safety radios, i.e., portable communication devices used by public safety personnel such as police, fire department, emergency medical technicians, and the military. In these devices, frequency bands such as the ultra high frequency (UHF) band (about 380-540 MHz or 770-870 MHz) and the Global Positioning Satellite (GPS) band (about 1.575 GHz) form particularly useful combinations for long range communications. The pairing of these frequency bands with a frequency band used for short-range communications is desirable. Bluetooth, which operates in the 2402-2480 MHz range, is a maturing technology that has gained significant public traction over the last several years. Thus, it would be desirable for the additional antenna to operate in this frequency range.

As above, incorporating an additional external antenna into the physical structure of a pre-existing portable radio is often not feasible due to the manufacturing changes required (e.g., molds, cost). Accordingly, it is desirable to add an internal antenna. However, it is often difficult to insert additional components such as an antenna in a structure already dense with physical and electronic objects. The design and incorporation of an antenna into such a structure is extremely challenging, especially in structures such as the Motorola APX™ 6000 and 7000 in which tolerances are tight.

Moreover, a large amount of metal parts including at least part of the chassis, shielding flex cables and more may be in close proximity (e.g., <about 5 mm) with the antenna, thereby significantly affecting the performance of the antenna due to the coupling with the nearby metal. While optimization of the resonance response of the antenna at the required frequency in tightly coupled conditions may be designed without an extraordinary amount of difficulty, simultaneous optimization for maximum radiation efficiency taking into account effects such as PCB layout limitations, geometry and electrical properties of all nearby objects, and interconnects between different parts of the communication device is non-trivial to say the least. Thus, both the antenna structure and the placement of the antenna within the communication device represent significant challenges.

Figure 3:
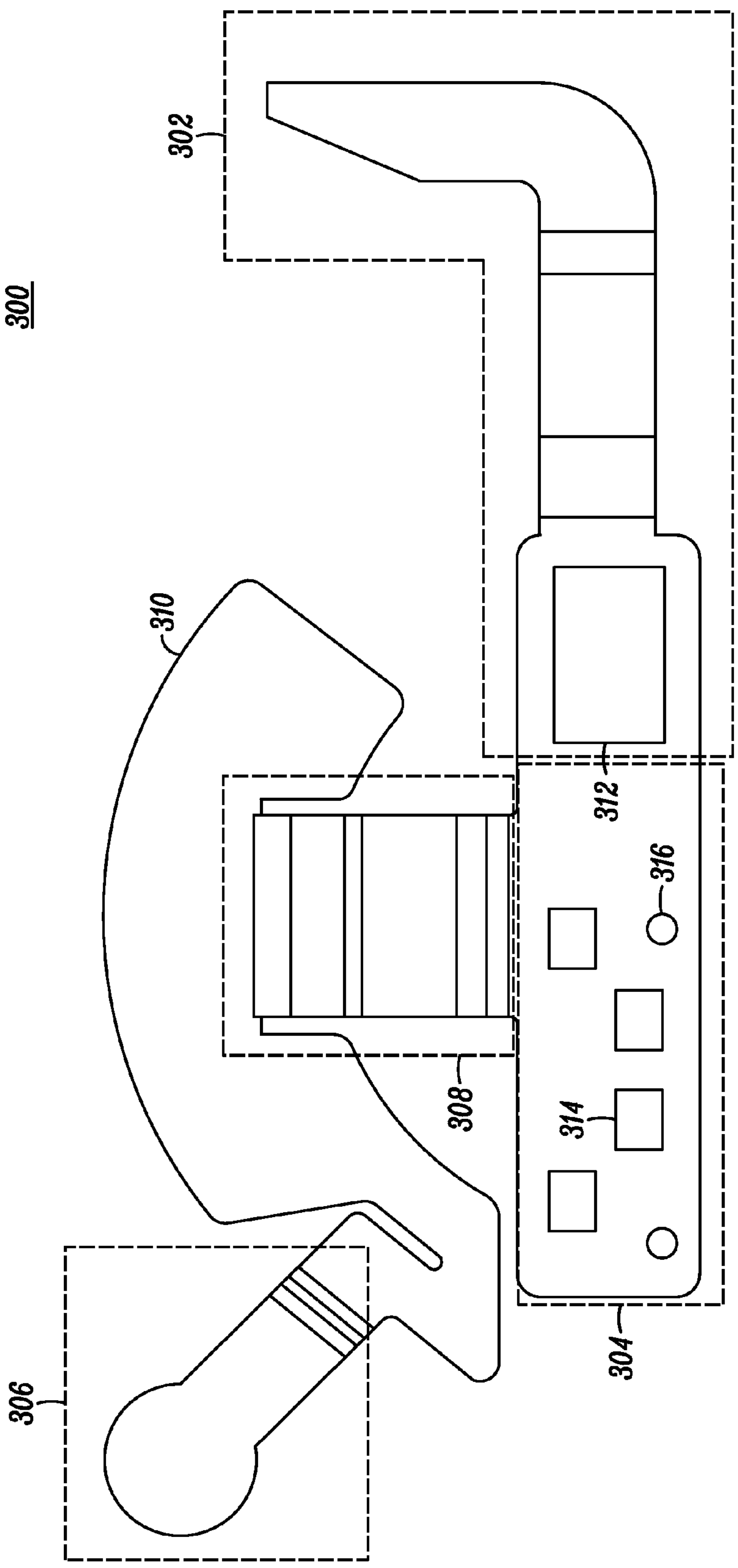
FIG. 3 illustrates an embodiment of a flexible structure containing an antenna.

One such embodiment of an antenna able to be placed into the radio is shown in FIG. 3. More specifically, a flexible structure 300 is shown in FIG. 3. The flexible structure 300 is formed from a flexible material and contains a Planar Inverted F-Antenna (PIFA), which is relatively small simple antenna structure that has a low profile, as well as being relatively easy to fabricate and thus has a low manufacturing cost. PIFAs are planar grounded patch antennas whose length is $\lambda/4$ rather than the conventional $\lambda/2$ length and can be shaped to conform to structural aspects of the radio. The PIFA 302 is disposed at one end of the flexible structure 300 and is substantially "L" shaped. The long leg of the L-shaped PIFA 302 has substantially the same width throughout, except for the portion of the long leg containing a launch pad 312. The short leg of the L-shaped PIFA 302, which initially from the vertex between the long and short legs has the same width as the majority of the long leg of the PIFA 302, tapers linearly to the terminus (free end) of the PIFA 302. The vertex between the long and short legs of the PIFA 302 is curved. A feed spring contact (not shown) contacts the launch pad 312 to provide a conduit for signals to be transmitted to and received from the PIFA 302.

Contact portions 314 are formed in a contact area 304 of the flexible structure 300. The elements of the flexible structure 300 are connected with external components in the radio, such as a PCB (which may contain the processor, memory and/or other components shown in FIG. 2), through the contact area 304. Other elements such as capacitors and inductors may be formed in different portions of the flexible structure 300, such as distal portion 306. The substantially rectangular contact area 304 extends from the long leg of the PIFA 302 and has a width somewhat larger than the long leg of the PIFA 302. The terms "extends from," "is adjacent to," or "directly contacts" are used herein interchangeably and thus defined synonymously. Similarly, ground springs contact the launch pad 312 to provide a ground to the antenna. The contact area 304 also contains holes 316 through which the flexible structure 300 is attached to the speaker bracket as described in more detail below.

The distal portion 306 of the flexible structure 300 is connected to the contact area 304 through a winding, distended S-shaped portion 310 and flexible cable 308. The distal portion 306 contains a contact pad to be connected with a microphone of the radio. The distal portion 306 and distended S-shaped portion 310 form an extension portion of the flexible structure 300. The flexible cable 308 extends perpendicularly from middle of one side of the contact area 304. The distended S-shaped portion 310 and the flexible cable 308 provide sufficient flexibility to enable the flexible structure 300 to be bent through the area between the speaker and speaker bracket, as described in more detail below, thereby enabling the flexible structure 300 to be employed in the limited space available.

One section of the distended S-shaped portion 310 contains a wider, gradual "C," while the remaining section of the distended S-shaped portion 310 has a smaller, less wide, "C" formed by straight portions. The lengths of the top and bottom legs of the "C" of the remaining section are different sizes, so that the connection between the legs is angled, forming a triangle. The distended S-shaped portion 310 contains a connection pad to be connected to the speaker so that signals can be supplied from/to the speaker through the flexible cable 308. The distended S-shaped portion 310 is shaped to allow alignment to the speaker for assembly and contains a plurality of (e.g., two) through hole connection pads at the edges of the distend portions (right and left). The through hole connection pads allow electrical connection to the speaker. The left portion (as shown in FIG. 3) of distend S-shaped portion 310 also routes the microphone transmission lines from contact portions 314 to distal portion 306.

Many PIFA designs are typically based on antenna structures not constrained by the limiting conditions similar to those present in the current radios, e.g., small available volume, substantial shielding of the available volume by metal (speaker, chassis, PCB). Thus, as above, design of the antenna is only one part of the solution to the above problems and is inseparable from finding a portion of the communication device relatively free of metal parts and redesigning the surrounding area if necessary. To this end, in one embodiment the flexible structure 300 containing the PIFA 302 was designed to be incorporated in the speaker bracket of the radio and takes into account both frequency of operation and loading of the antenna by the surrounding metal and plastic components of the radio, which, as mentioned above, affects the antenna efficiency. The speaker bracket is formed primarily from a non-conductive material such as a low-loss plastic, thereby maximizing the separation of the PIFA 300 from the surrounding metal chassis.

Figure 4:
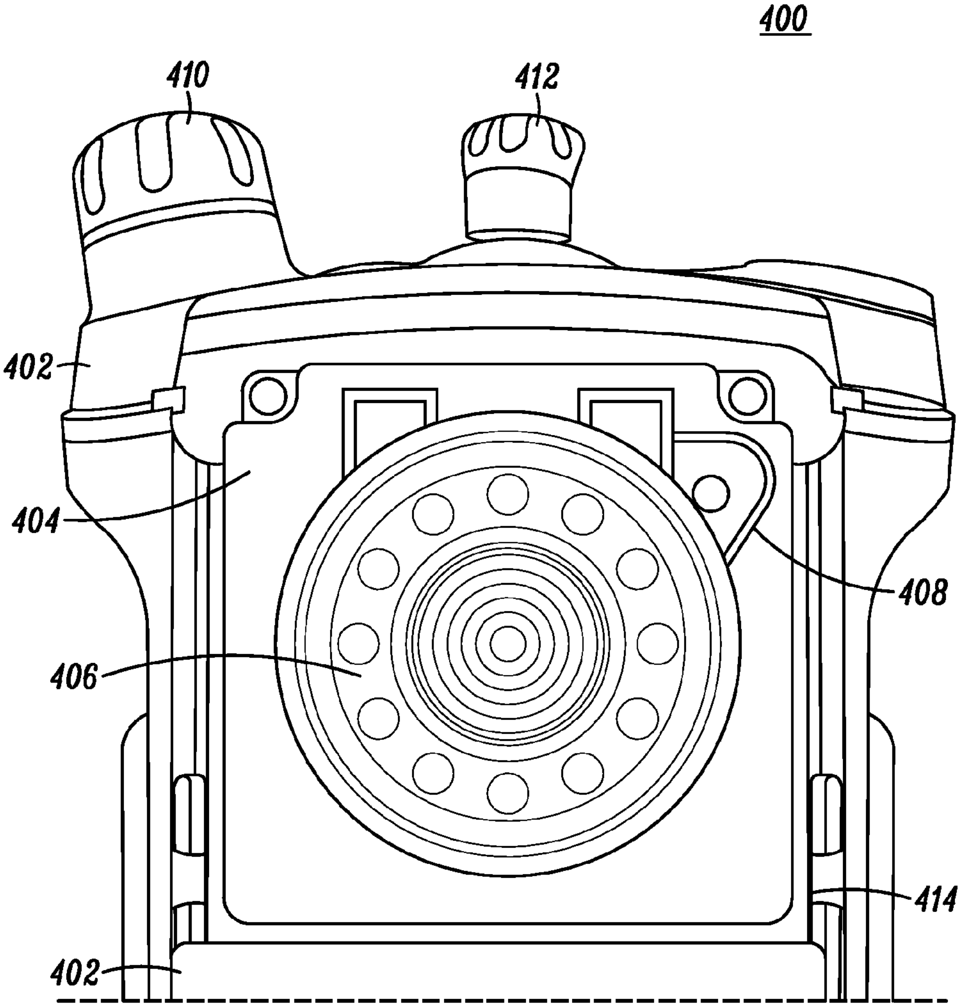
FIG. 4 illustrates an embodiment of a radio incorporating the flexible structure.

One embodiment of a front view of a radio in which the flexible structure 300 containing the PIFA 302 is disposed is shown in FIG. 4. The radio 400 has a chassis 402 formed primarily from molded plastic or some other similar material in which various mechanical and electrical components are disposed. The radio 400 contains a housing 414 in the chassis 402. The housing 414 includes a substantially square speaker bracket 408 in which the flexible structure 404 and speaker 406 are disposed. Specifically, the flexible structure 404 is disposed at one surface (shown in FIGS. 5-6 as the bottom) of the speaker bracket 408 near the speaker 406. As the flexible structure 404 is at the bottom of the speaker bracket 408, only the relative location is indicated in FIG. 4. The speaker grill normally situated in front of the speaker 406, which protects the speaker 406 and speaker bracket 408, has been removed for clarity. The radio 400 also contains user inputs including a volume control knob 410 and a channel select knob 412. The chassis 402 and speaker 406 are substantially metallic. A metallic shield (not shown) may be disposed around sections within the chassis 402, e.g., to reduce interference.

Figure 5A:
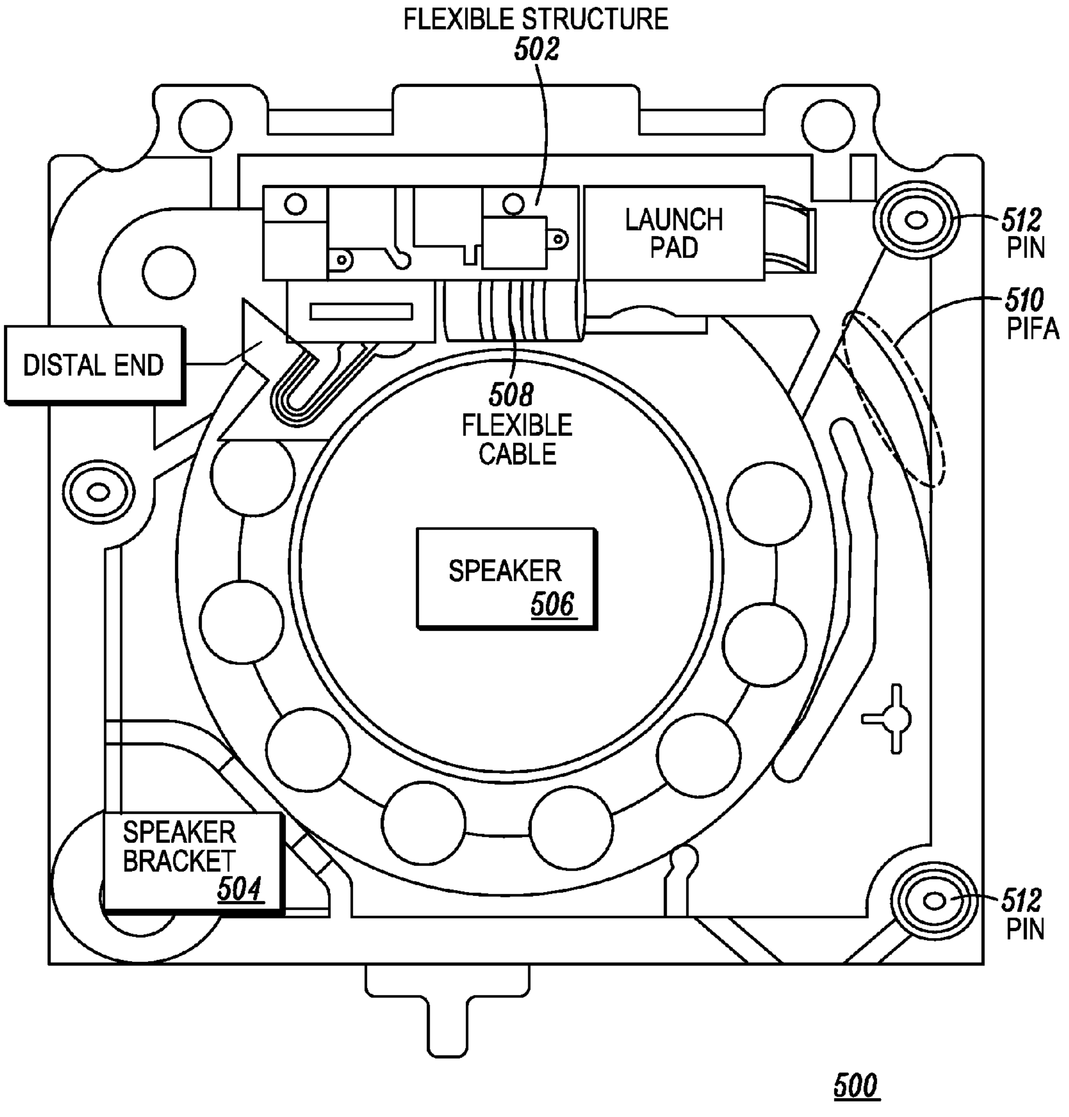
FIG. 5A illustrates a top view of an embodiment of a speaker bracket of the device shown in FIG. 4 incorporating the flexible structure.
Figure 5B:
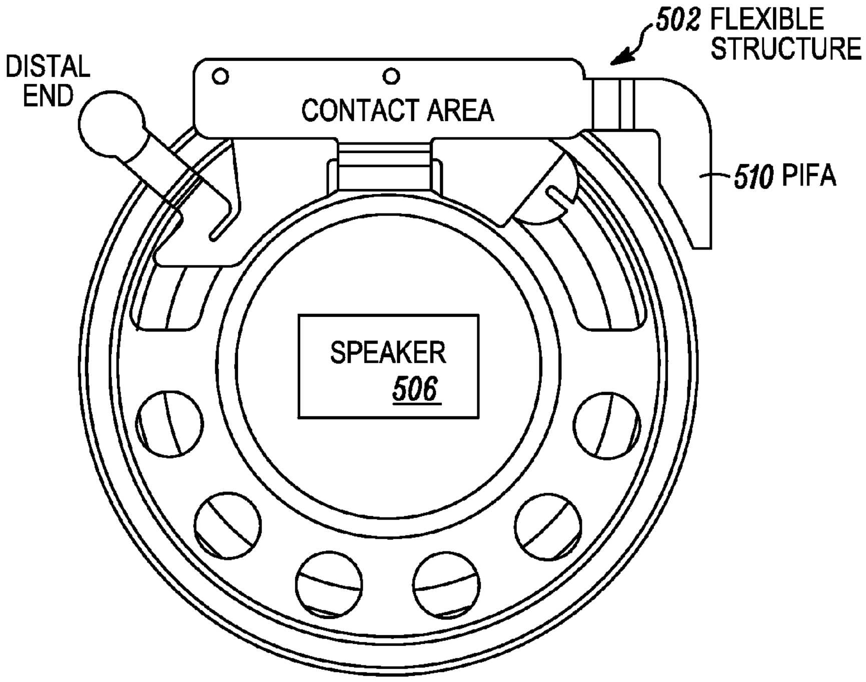
FIG. 5B is a schematic diagram of the speaker and flexible structure.
Figure 5C:
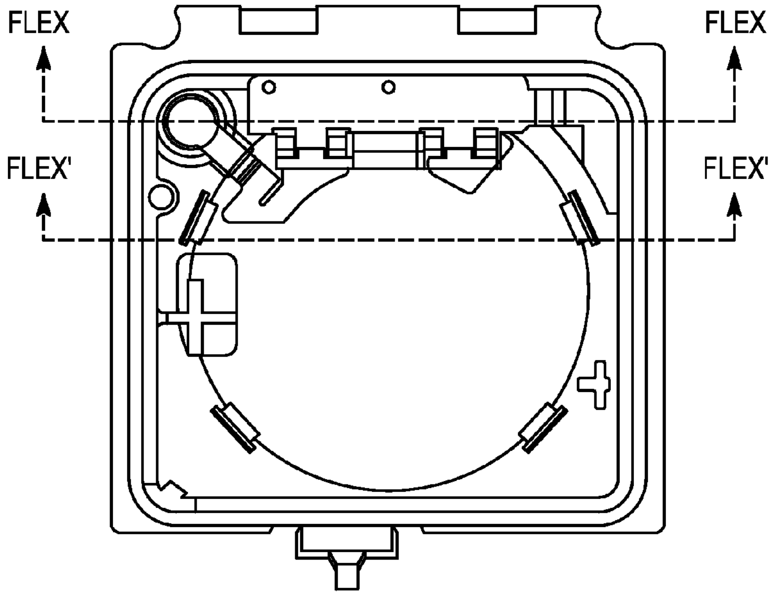
FIG. 5C is a schematic diagram of the speaker bracket and flexible structure.
Figure 6A:
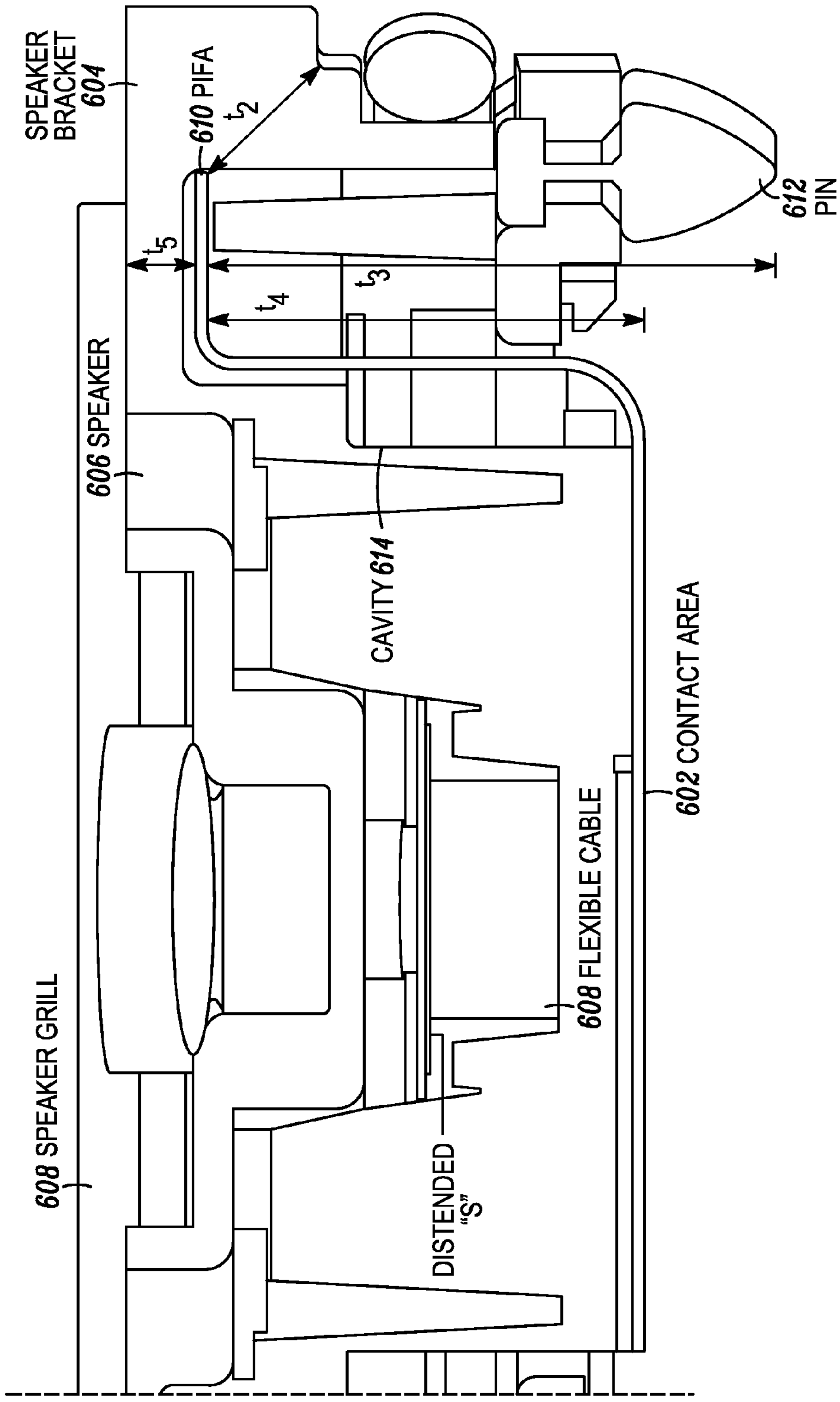
FIG. 6A illustrates a cross-sectional view of the speaker bracket of FIG. 5B taken along the FLEX line.
Figure 6B:
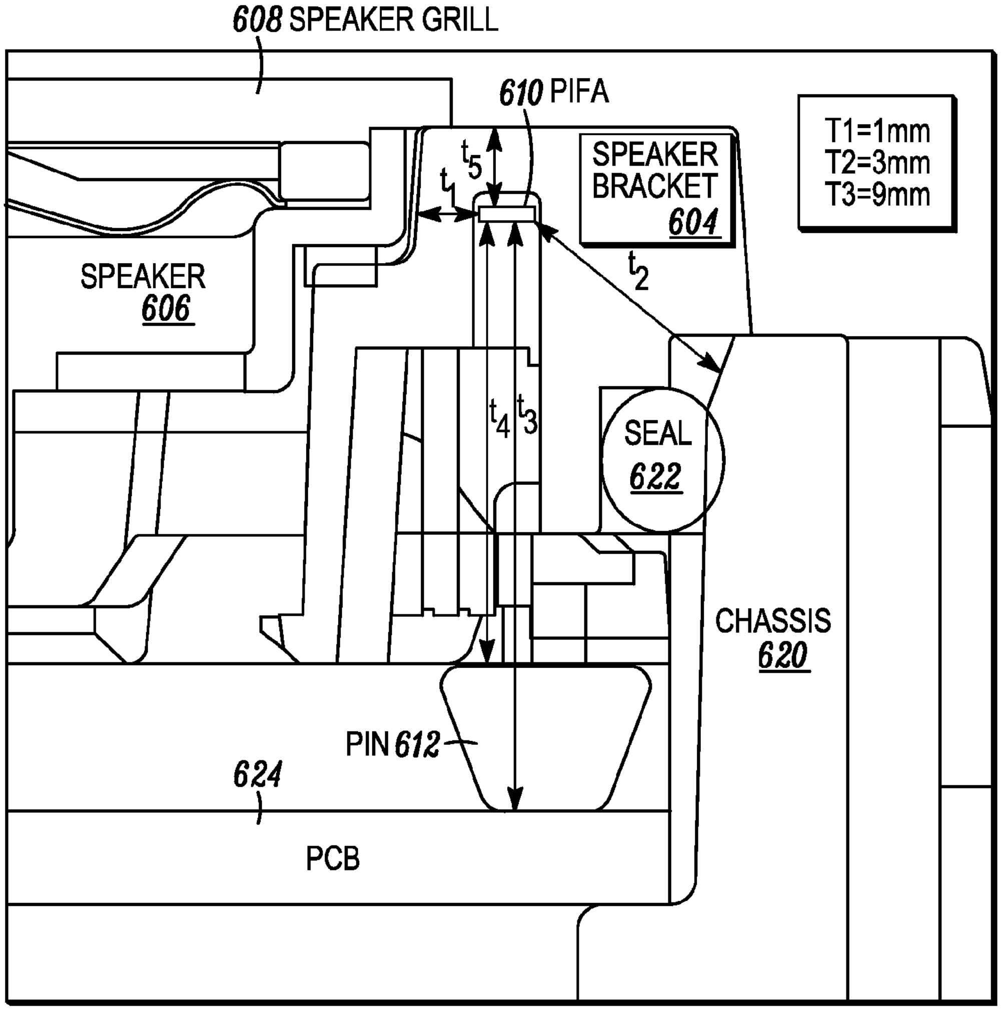
FIG. 6B illustrates a cross-sectional view of the speaker bracket of FIG. 5B taken along the FLEX' line.

FIG. 5A illustrates a front view of the housing of FIG. 4 with the chassis removed and FIG. 5C shows a schematic of this view. FIG. 5B shows a schematic of the rear view of the speaker and flexible structure of FIG. 5A, while FIG. 6A illustrates a cross-sectional view of the housing taken along the "flex" line shown in FIG. 5B while FIG. 6B illustrates a cross-sectional view of the housing taken along the "flex'" line shown in FIG. 5B. As shown, the flexible structure 502 is disposed in the speaker bracket 504, 604 of the housing 500 on one side of the speaker 506, 606. One or more sections of the flexible structure 502 may be attached to the speaker bracket 504, 604 through screws or adhesive. The speaker 506, 606 is disposed in the center of the speaker bracket 504, 604. The speaker bracket 504, 604 and speaker 506, 606 are snapped together into a single assembly using pins 512, 612, which contact the PCB 624. A seal 622 is disposed between the speaker bracket 604 and the chassis 620, preventing liquid from entering the radio.

The contact area, containing the launch pad and contact portions, of the flexible structure 502 is disposed at one face of the speaker bracket 504, 604, hereinafter referred to as the bottom of the speaker bracket 504, 604 (as illustrated in FIGS. 6A and 6B) for convenience. The flexible cable 508, 608 of the flexible structure 502 curves into the interior (perpendicular to the plane shown by FIGS. 5A-5C, parallel to the plane shown by Fig. FIGS. 6A and 6B) of the speaker bracket 504, 604 and eventually becomes parallel with the contact area and launch pad so that the distal end is disposed on a different plane than the contact area farther from the speaker 506, 606 than the contact area. Similarly, the PIFA 510, 610 curves inward through a cavity 614 designed to guide and retain the free end of the PIFA 510, 610 and eventually becomes parallel with the contact area so that the free end of the PIFA 510, 610 is disposed on a different plane than the contact area. The PIFA 510, 610 and distal end of the PIFA 510, 610 are essentially disposed in different corners of the speaker bracket 504, 604 relatively far from the speaker 506, 606.

As shown in the figures, both the speaker bracket 504, 604 and the flexible structure 502 have been designed so that the flexible structure 502 is integrated in the speaker bracket 504, 604 between the speaker 506, 606 and the chassis 620. In addition to carrying the signals to/from the PIFA 510, 610, the flexible structure 502 conveys audio signals such as the signal lines between the speaker and microphone and the PCB using conductive traces on the flexible. These traces on the flexible cable 508, 608 are separated sufficiently from the PIFA 510, 610 (as shown, a few mm) such that there is sufficient decoupling of the PIFA 510, 610 signals from the audio signals and thus the amount of crosstalk is insubstantial. The audio signals are supplied to the flexible structure 502 through spring contacts such as those used for the feed and ground of the PIFA 510, 610.

The launch pad shown in the figures is designed to maximize the length available for the PIFA 510, 610 while simultaneously maximizing the distance between the high charge point of the PIFA 510, 610 and the various metal components in the radio such as the PCB ground, speaker metal and chassis. The high charge point of the PIFA 510, 610 is the free end of the PIFA 510, 610, and thus excessive coupling between the charge at this location and the rest of the metallic structure, which degrades performance, is minimized. The launch pad is relatively close to the area where the flexible cable contacts are disposed and therefore the contacts are coupled with the PIFA 510, 610. Thus, when the PIFA 510, 610 is tuned and optimized, this process occurs with those elements in place. Examples of these distances are, for example about 1 mm between the free end of the PIFA 510, 610 and the speaker 606 (shown as $t_1$ in FIG. 6B), about 3 mm between the free end of the PIFA 510, 610 and the chassis 620 (shown as $t_2$ in FIGS. 6A and 6B), and about 9 mm between the free end of the PIFA 510, 610 and the PCB 624 (shown as $t_3$ in FIGS. 6A and 6B). The free end of the PIFA 510, 610 and the distal portion are each are disposed on a different plane than the end of the flexible cable 508, 608 connected with the PIFA 510, 610 and are separated by a distance at least about as large as a radius of the speaker 506, 606.

As shown in FIGS. 6A and 6B, the contact area 602 of the flexible structure winds through substantially the entire volume of the speaker bracket 604. As is apparent, the launch pad, contacted by the feed contact and ground contact, shares the same planar surface section as the contact(s) to the speaker and microphone lines. The antenna depth is shown as $t_4$, the distance between the planes formed by the contact area/bottom of the speaker bracket 604 and the end of the PIFA 610. This distance $t_4$ (the depth of the flex free-end to the speaker bracket) is substantially the entire depth of the speaker bracket 604 and is about 7.33-7.51 mm (nominally 7.42 mm) in the embodiment shown. The distance between the end of the PIFA 610 and the top of the speaker bracket 604, $t_5$ (thickness of the speaker bracket plastic above the free end of the antenna), is about 1/7 of $t_4$ or about 0.94-1.06 mm (nominally about 1 mm) as shown. The free end of the PIFA 602 and launch pad are non-planar, with at least the tapered portion of the free end being parallel with the launch pad (and contact area in general).

Figure 7:
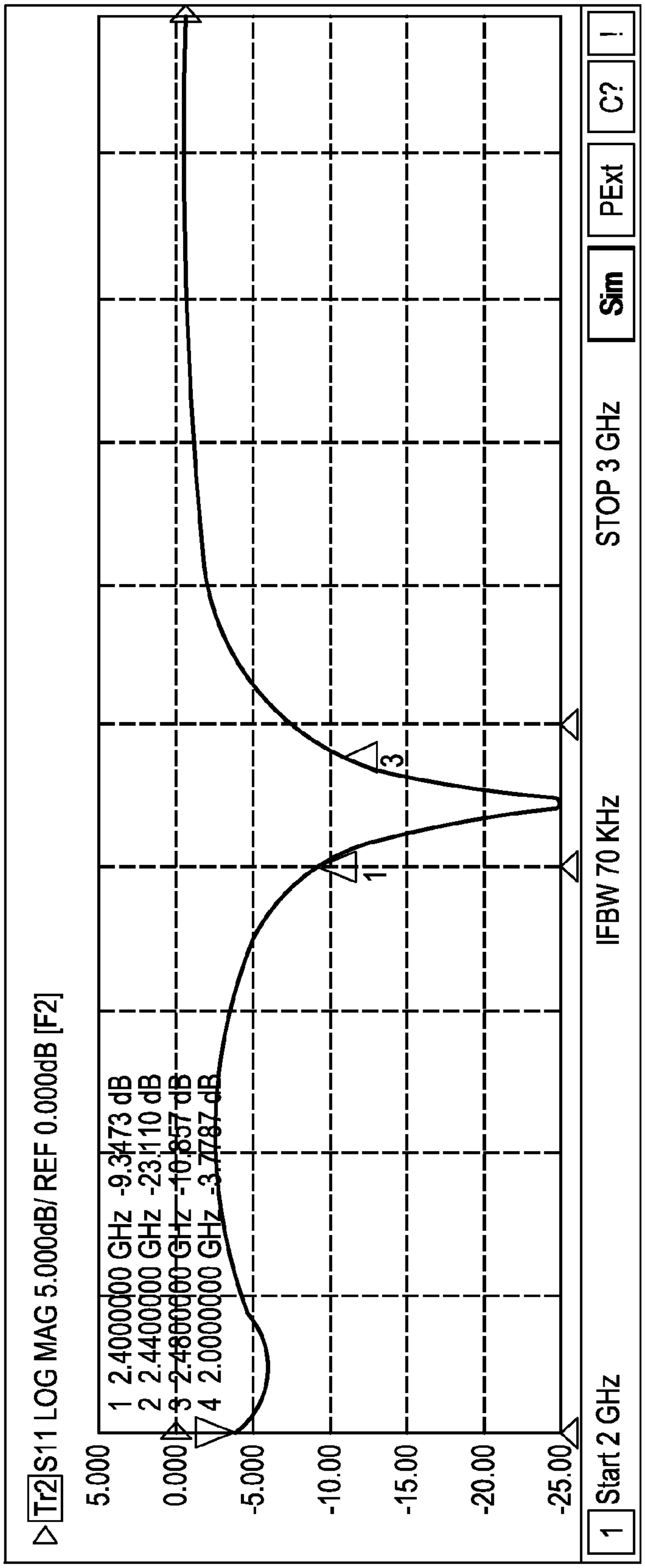
FIGS. 7-8 illustrate the measured return loss and efficiency of the embodiment shown in FIG. 4.
Figure 8:
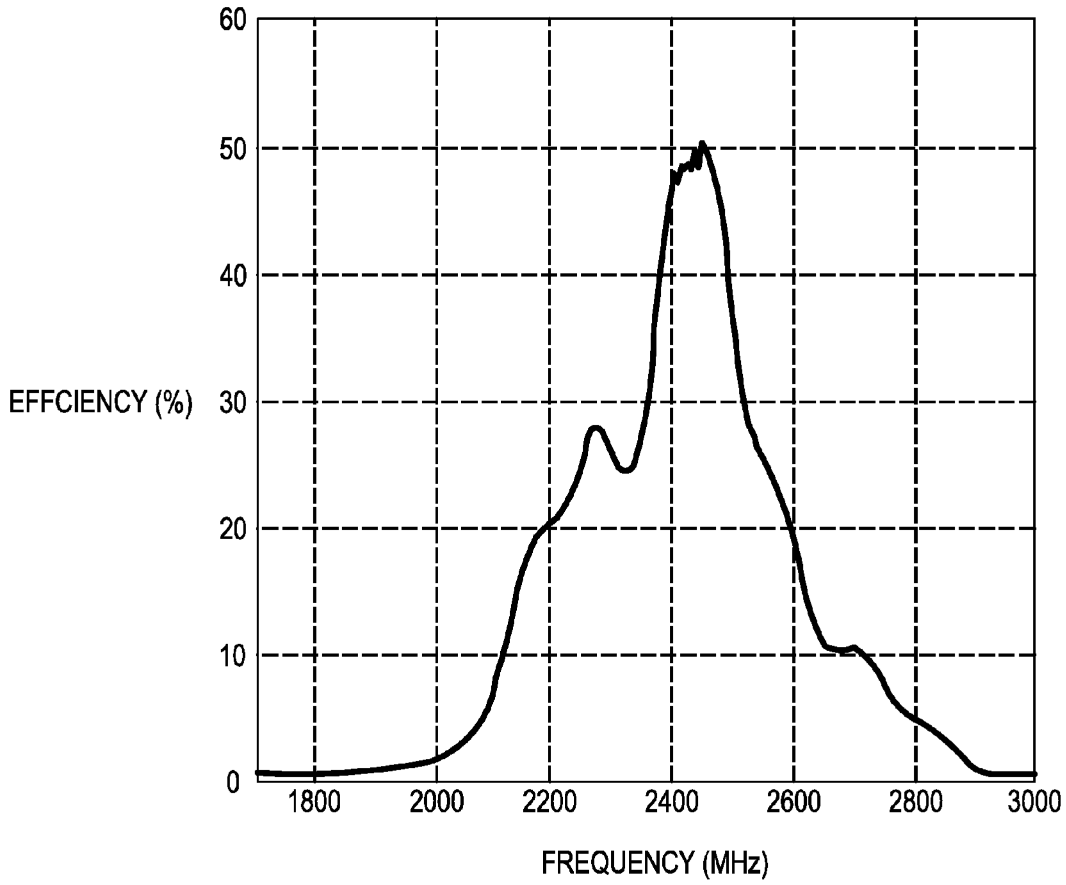

Measurements of the return loss (S11) of the PIFA of FIG. 3 show good matching using one matching element (a 1 pF capacitor) and an efficiency of better than 35% (mostly between 40% and 55%) along the entire Bluetooth frequency band, as illustrated in FIGS. 7 and 8, respectively. In other embodiments, the PIFA is designed to optimize the performance using a three or more element matching circuit. Having an efficiency of greater than about 35% is sufficient to allow the radio to communicate with external devices such as Bluetooth headsets, whose expected performance is generally well known.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure and Summary section are provided to allow the reader to quickly ascertain the nature of the technical disclosure. It is submitted with the understanding that neither will be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Those skilled in the art will recognize that a wide variety of modifications, alterations, and combinations can be made with respect to the above described embodiments without departing from the spirit and scope of the invention and that such modifications, alterations, and combinations are to be viewed as being within the scope of the inventive concept. Thus, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims issuing from this application. The invention is defined solely by any claims issuing from this application and all equivalents of those issued claims.

The invention claimed is:

1. A flexible structure for coupling one or more audio input/output components to a radio to a radio processor and incorporating an internal antenna, the flexible structure comprising:

a contact area comprising elements for electrically connecting the flexible structure with the radio processor;

a substantially L-shaped planar inverted F-antenna (PIFA) extending in a first direction from one end of the contact area and bending to a second direction perpendicular to the first direction, the antenna including a launch pad area comprising ground and signal conduits for the antenna separate from the contact area;

a flexible cable portion containing conductive traces extending in a third direction, substantially perpendicular to the first direction, from another end of the contact area sufficiently far from the PIFA to decouple signals carried by the conductive traces from signals carried by the PIFA; and an extension portion extending from an end of the flexible cable opposite the end coupled to the contact area, the flexible cable conductive traces configured to transmit signals between the elements in the contact area and contacts in the extension portion coupling the extension portion to the one or more audio input/output components of the radio.

2. The flexible structure of claim 1, wherein the PIFA has a long leg adjacent to the contact area and, after the bend, a short leg whose planar width tapers in a direction from the bend towards a free end.

3. The flexible structure of claim 1, wherein the extension portion contains a distended S-shaped portion and a distal portion adjacent to the distended S-shaped portion, the distended S-shaped portion adjacent to the flexible cable, the contacts in the extension portion being disposed in both the distended S-shaped and distal portions.

4. The flexible structure of claim 1, the contact area further containing through holes for attaching the flexible structure to a speaker bracket supporting the one or more audio input/output components of the radio.

5. A housing comprising:

a radio processor;

a non-conductive speaker bracket;

a speaker disposed within the speaker bracket; and a flexible structure disposed within the speaker bracket, the flexible structure containing:

a contact area comprising elements for electrically connecting the flexible structure with the radio processor;

a substantially L-shaped planar inverted F-antenna (PIFA) extending in a first direction from one end of the contact area and bending to a second direction perpendicular to the first direction, the antenna including a launch pad area comprising ground and signal conduits for the antenna separate from the contact area;

a flexible cable portion containing conductive traces extending in a third direction, substantially perpendicular to the first direction, from another end of the contact area sufficiently far from the PIFA to decouple signals carried by the conductive traces from signals carried by the PIFA; and an extension portion extending from an end of the flexible cable opposite the end coupled to the contact area, the flexible cable conductive traces configured to transmit signals between the elements in the contact area and contacts in the extension portion coupling the extension portion to the speaker.

6. The housing of claim 5, wherein the speaker bracket is substantially square, the speaker is disposed in substantially a center of the speaker bracket, and the antenna is disposed at one surface of the speaker bracket and curves inward and away from the speaker such that a free end of the antenna is disposed near a corner of the speaker bracket in a cavity formed in the speaker bracket.

7. The housing of claim 5, wherein the launch pad is formed in a same plane as the contact area.

8. The housing of claim 7, wherein a free end of the antenna and extension portion are each disposed in a different plane than the flexible cable and are separated by a distance at least as large as a radius of the speaker.

9. The housing of claim 7, wherein the antenna has a uniform width therethrough until reaching a free end where a planar width tapers with increasing distance from bend to the free end, the antenna curves inward towards the speaker and then outward away from the speaker such that the free end is in a plane parallel with but separate from the launch pad.

10. The housing of claim 5, wherein the antenna extends from a back surface of the speaker bracket into the speaker bracket a majority of the way into the speaker bracket before turning outward away from the speaker such that a free end of the antenna is parallel with a front surface of the speaker bracket opposite the back surface of the speaker bracket and such that the flexible antenna extends substantially the entire depth of the speaker bracket.

11. The housing of claim 5, the contact area further containing through holes for attaching the flexible structure to the speaker bracket.

12. A radio comprising:

an antenna configured for long range communication over a first frequency;

a microphone;

a radio processor;

a housing containing:

a non-conductive speaker bracket;

a speaker disposed within the speaker bracket; and a flexible structure disposed within the speaker bracket, the flexible structure containing:

a contact area comprising elements for electrically connecting the flexible structure with the radio processor;

a flexible substantially L-shaped planar inverted F-antenna (PIFA) for short range communication over a second frequency extending in a first direction from one end of the contact area and bending to a second direction perpendicular to the first direction, the antenna including a launch pad area comprising ground and signal conduits for the antenna separate from the contact area;

a flexible cable portion containing conductive traces extending in a third direction, substantially perpendicular to the first direction, from another end of the contact area sufficiently far from the PIFA to decouple signals carried by the conductive traces from signals carried by the PIFA; and an extension portion extending from an end of the flexible cable opposite the end coupled to the contact area, the flexible cable conductive traces configured to transmit signals between the elements in the contact area and contacts in the extension portion coupling the extension portion to the speaker and the microphone; and a metal chassis at least partially surrounding the housing.

13. The radio of claim 12, wherein the speaker bracket is substantially square, the speaker is disposed in a center of the speaker bracket, and the flexible antenna is disposed at a back surface of the speaker bracket and curves inward and towards the speaker before turning away from the speaker and toward the chassis such that a free end of the flexible antenna is disposed near a corner of the speaker bracket in a cavity formed in the speaker bracket.

14. The radio of claim 12, wherein the launch pad is disposed in a same plane as the contact area.

15. The radio of claim 14, wherein a free end of the flexible antenna and extension portion are each are disposed on a different plane than the end of the flexible cable and are separated by a distance at least about as large as a radius of the speaker.

16. The radio of claim 14, wherein the antenna has a uniform width therethrough until reaching a free end where a planar width tapers with increasing distance from the bend to the free end, the antenna curves inward towards the speaker and then outwards away from the speaker such that the free end is in a plane parallel with but separate from the launch pad.

17. The radio of claim 12, wherein the flexible antenna extends from a back surface of the speaker bracket into the speaker bracket a majority of the way into the speaker bracket before turning outward away from the speaker such that a free end of the flexible antenna is parallel with a front surface of the speaker bracket opposite the back surface of the speaker bracket and such that the flexible antenna extends substantially the entire depth of the speaker bracket.

18. The radio of claim 12, wherein the flexible antenna is bent in the speaker bracket to maximize the length of the PIFA as well as a distance between a free end of the PIFA and conductive components in the radio including ground, metal of the speaker, and metal of the chassis.

19. The radio of claim 12, the contact area further containing through holes for attaching the flexible structure to the speaker bracket.

* * * * *